(12) United States Patent
Chuang

(10) Patent No.: US 6,840,498 B2
(45) Date of Patent: Jan. 11, 2005

(54) ZERO PRESSURE ELECTROMAGNETIC SERVER

(76) Inventor: Wen-Ya Chuang, No. 101-10, Fengren Rd., Renwu Shiang, Kaohsiung (TW)

( * ) Notice: Subject to any disclaimer, the term of this patent is extended or adjusted under 35 U.S.C. 154(b) by 137 days.

(21) Appl. No.: 10/372,223

(22) Filed: Feb. 25, 2003

(65) Prior Publication Data

US 2004/0164262 A1 Aug. 26, 2004

(51) Int. Cl.$^7$ ............................................... F16K 31/02
(52) U.S. Cl. ................................. 251/129.07; 251/282
(58) Field of Search ........................ 251/129.07, 129.15, 251/282

(56) References Cited

U.S. PATENT DOCUMENTS 3,572,382 A * 3/1971 Luthe .................... 137/625.35
6,330,880 B1 * 12/2001 Okada et al. ............ 123/568.2

* cited by examiner

Primary Examiner—Edward K. Look
Assistant Examiner—John K. Fristoe, Jr.
(74) Attorney, Agent, or Firm—Birch, Stewart, Kolasch & Birch, LLP

(57) ABSTRACT

A zero pressure electromagnetic server mainly includes an electromagnetic controlling valve stem. The valve stem has two sealing sides of the same area to seal respectively two valve openings. The valve stem has an axial flow opening to channel the positive pressure to the two sealing sides to generate a thrust force and a bucking force opposite to each other for offsetting. Thus the valve stem has no loading and a spring completely controls the closing of the valve. An electromagnetic coil is provided to control the opening size of the valve opening so that accurate conveying quantity may be achieved.

5 Claims, 6 Drawing Sheets

US 6,840,498 B2

ZERO PRESSURE ELECTROMAGNETIC SERVER

FIELD OF THE INVENTION

The present invention relates to a zero pressure electromagnetic server and particularly to a valve that has a valve stem on which a positive pressure and a negative pressure are offset with each other to become a no loading state.

BACKGROUND OF THE INVENTION

The design of general electromagnetic servers usually employs a spring force to control the closing of valve openings. And an electromagnetic coil is used to control the opening and closing the valve openings. When conveying goods enter into the valve, the positive pressure must be controlled to be less than the bucking force of the spring. Otherwise the valve cannot be closed completely. Hence the bucking force of the spring must be increased. However, to achieve this end also has to increase the capacity of the electromagnetic coil and result in a greater size for the server. Such a structural problem mainly is caused by a positive pressure or a negative pressure exerting on the valve stem that cannot be offset. Improvements taken by producers often focus on the size of the spring or the electromagnetic coil. The basic problem remains unresolved. It baffles producers and creates a lot of problems. The accuracy of valve control also is affected. Therefore to eliminate the positive and negative pressure applying on the valve stem to achieve a no loading state is the goal of the invention.

SUMMARY OF THE INVENTION

The primary object of the invention is to provide an electromagnetic server that has zero pressure and has a electromagnetic coil and a spring mating each other to effectively control the opening and closing of the valve.

Another object of the invention is to provide an electromagnetic server that has a simple structure and is easy to assemble and install.

A further object of the invention is to provide an electromagnetic server that is capable of fine tuning the conveying quantity and precisely controlling the ejection quantity.

Yet another object of the invention is to provide an electromagnetic server that is adaptable to various types of machinery.

In order to achieve zero loading by offsetting the positive pressure with the negative pressure, the invention has two sealing sides on the valve stem to close two valve openings. The valve stem has an axial flow opening to channel the positive pressure to generate an offset positive pressure so that the positive pressure and the offset positive pressure are applied respectively on the two sealing sides. One becomes a positive pressure thrust force while another becomes a positive pressure bucking force. The two forces are offset to create a zero pressure and no loading state for the valve stem. Thus opening and closing of the valve are completely controlled by the spring and the electromagnetic valve. And conveying quantity can be adjusted accurately.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
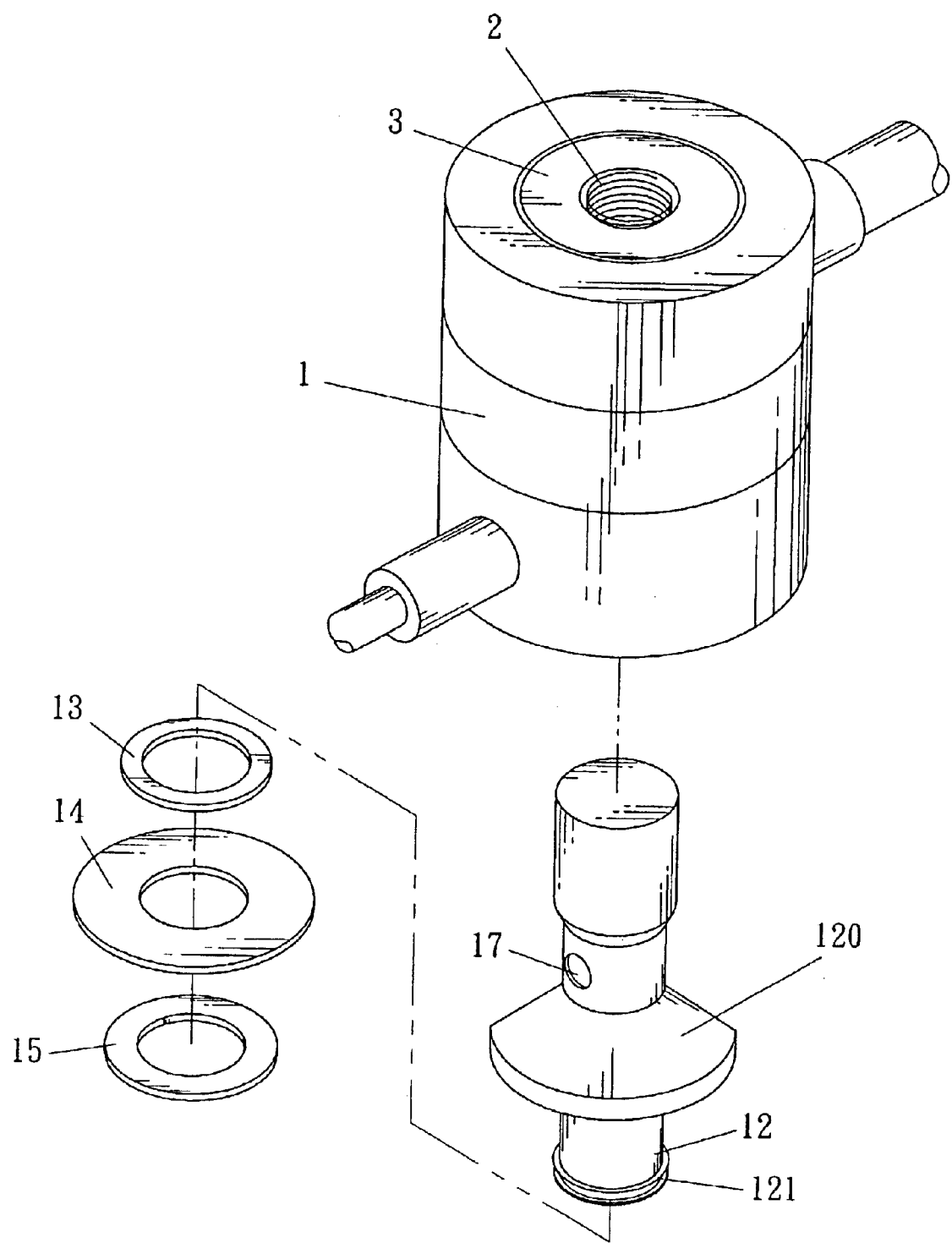
FIG. 1 is an exploded view of the invention.
Figure 2:
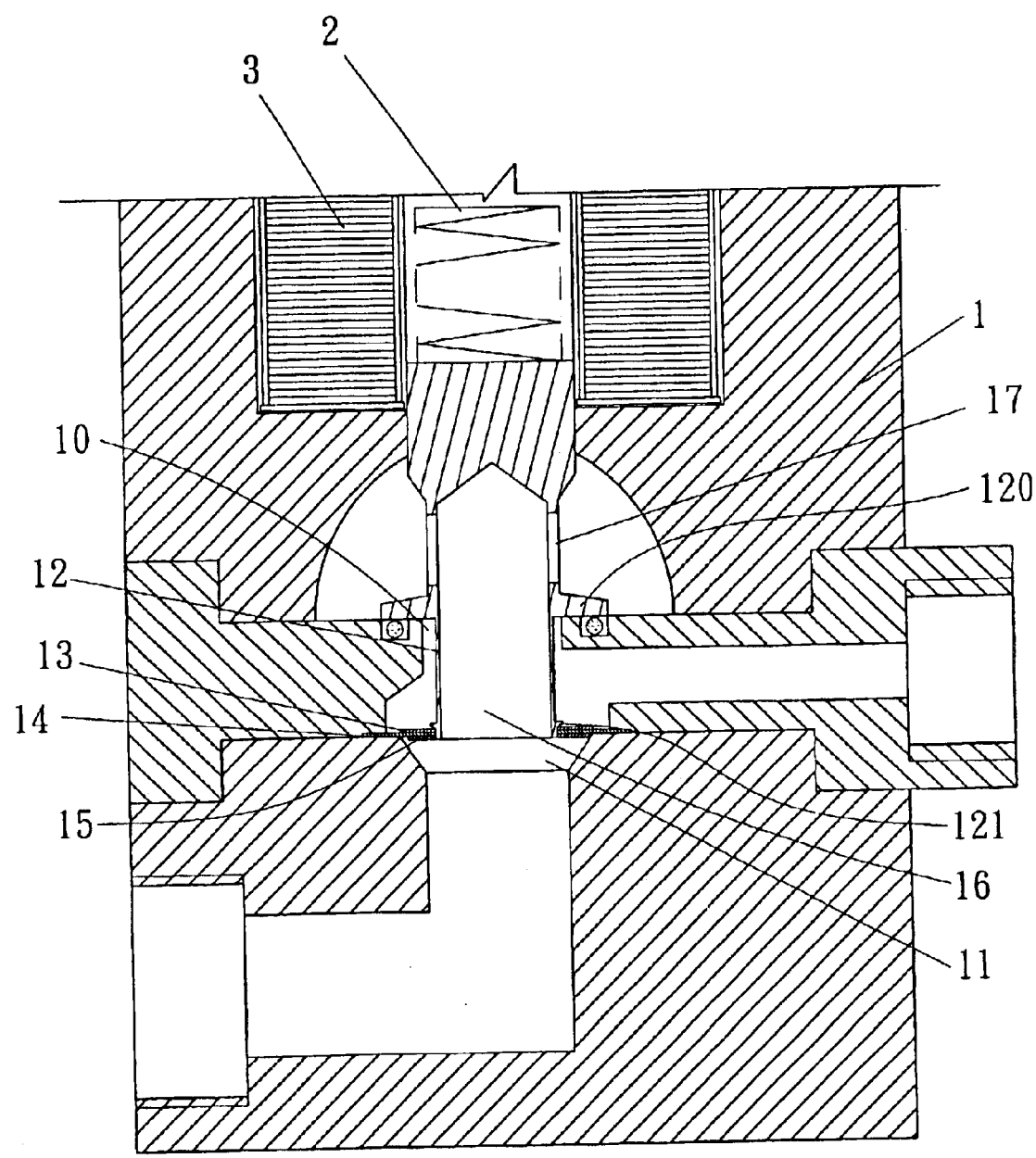
FIG. 2 is a sectional view of the invention.

Referring to FIGS. 1 and 2, the server of the invention has a three-stage structure to complete a valve passage. It includes a main body 1 which has a first valve opening 11 and a second valve opening 10, and a valve stem 12 which has a first sealing side 121 and a second sealing side 120 formed in flat surfaces to close the valve openings 11 and 10. The second sealing side 120 and the valve stem 12 are integrally formed. The first sealing side 121 consists of a washer 13, a membrane 14 and a fixing plate 15. The first sealing side 121 is fastened to a distal end of the valve stem 12. The valve stem 12 has a center opening 16 running through the distal end and leading to an axial flow opening 17 normal to the center opening 16 and the exterior of the valve stem 12. The valve stem 12 has a tail end coupling with a spring 2 which provides a thrust force for sealing the valve. The valve stem 12 is surrounded by an electromagnetic coil 3 which controls the up and down movements of the valve stem 12 to control opening and closing of the valve openings.

Figure 3:
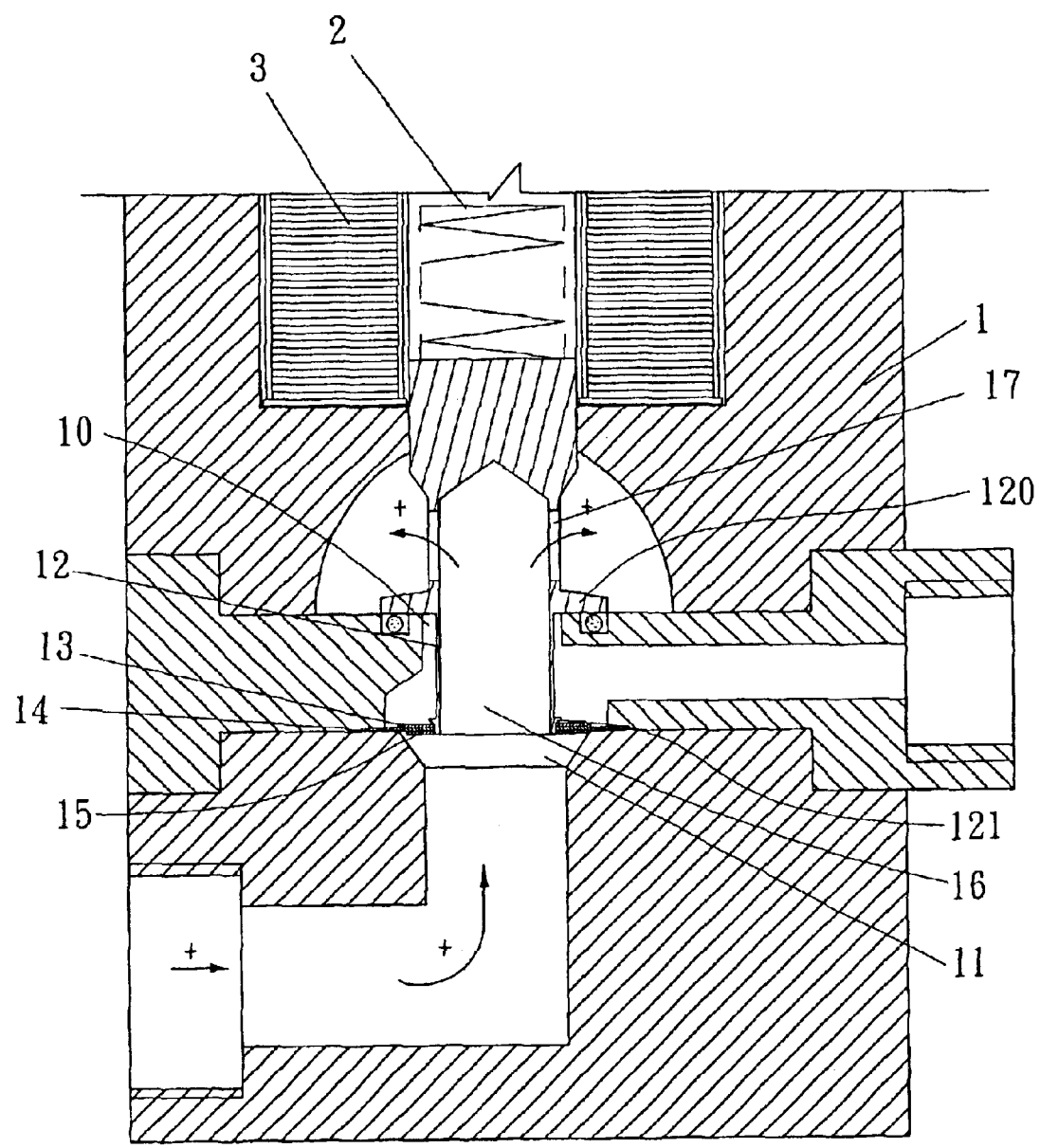
FIG. 3 is a schematic view of the invention showing the pressure being offset.
Figure 4:
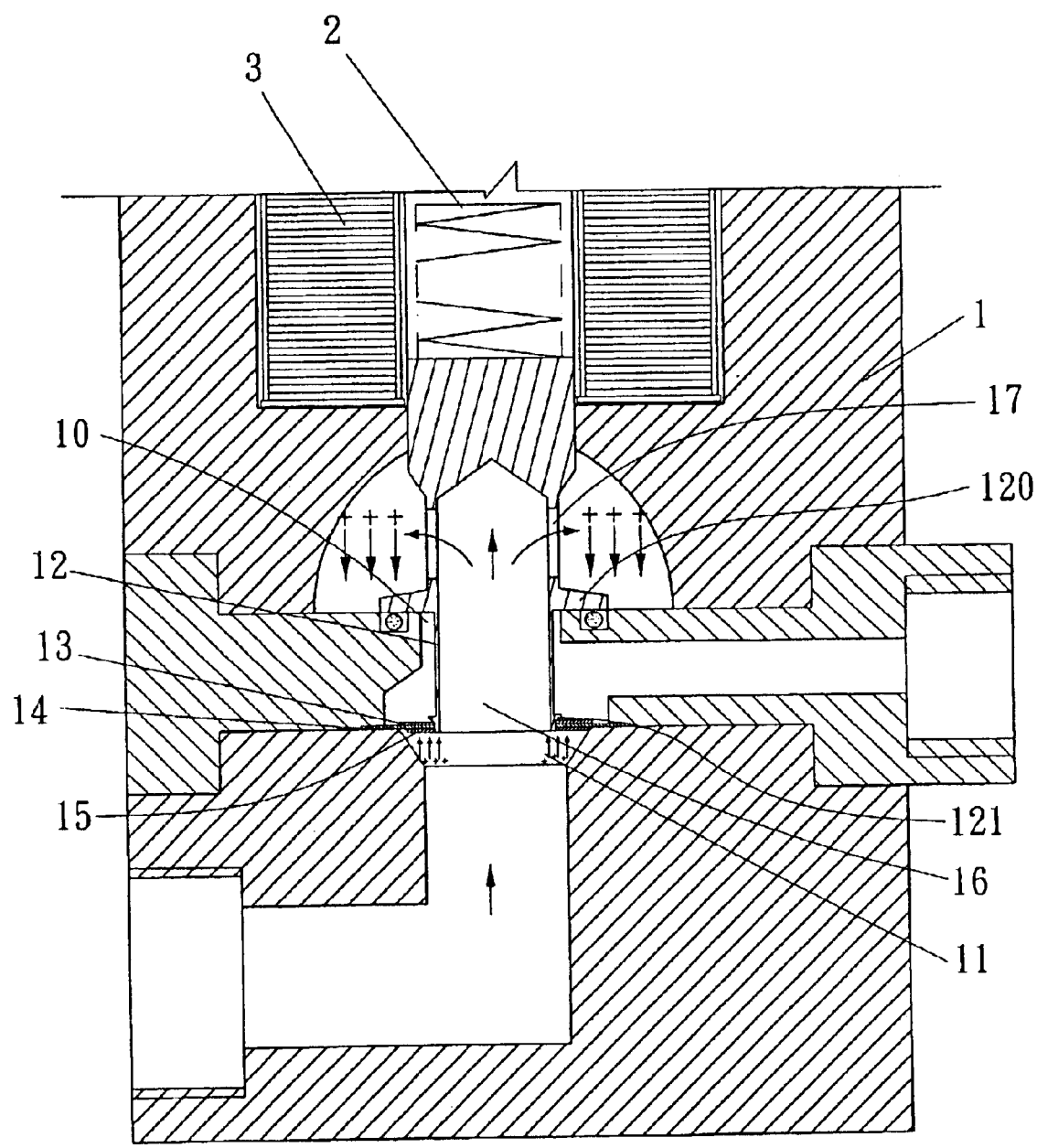
FIG. 4 is another schematic view of the invention showing the pressure being offset.

Referring to FIGS. 3 and 4, when in operations, the positive pressure passes through the first valve opening 11 and pushes the first sealing side 121. The thrust force receiving area is defined by the diameter of the fixing plate 15. In the mean time, the positive pressure also passes through the center opening 16 of the valve stem 12 towards the axial flow opening 17 and forms a bucking pressure on the second sealing side 120. The bucking force receiving area is defined by the diameter of the second sealing side 120. The two force receiving areas are designed with the same size. One is under the pressure of the thrust force, and another one is under the pressure of the bucking force. The two pressures are offset with each other. Thus the positive pressure is completely eliminated. And the valve stem 12 is under a zero pressure and no loading state. The spring 2 controls the opening and closing of the valve. When there is a desire to open or close the valve opening in a selected range, it can be controlled accurately by the electromagnetic coil 3.

Figure 5:
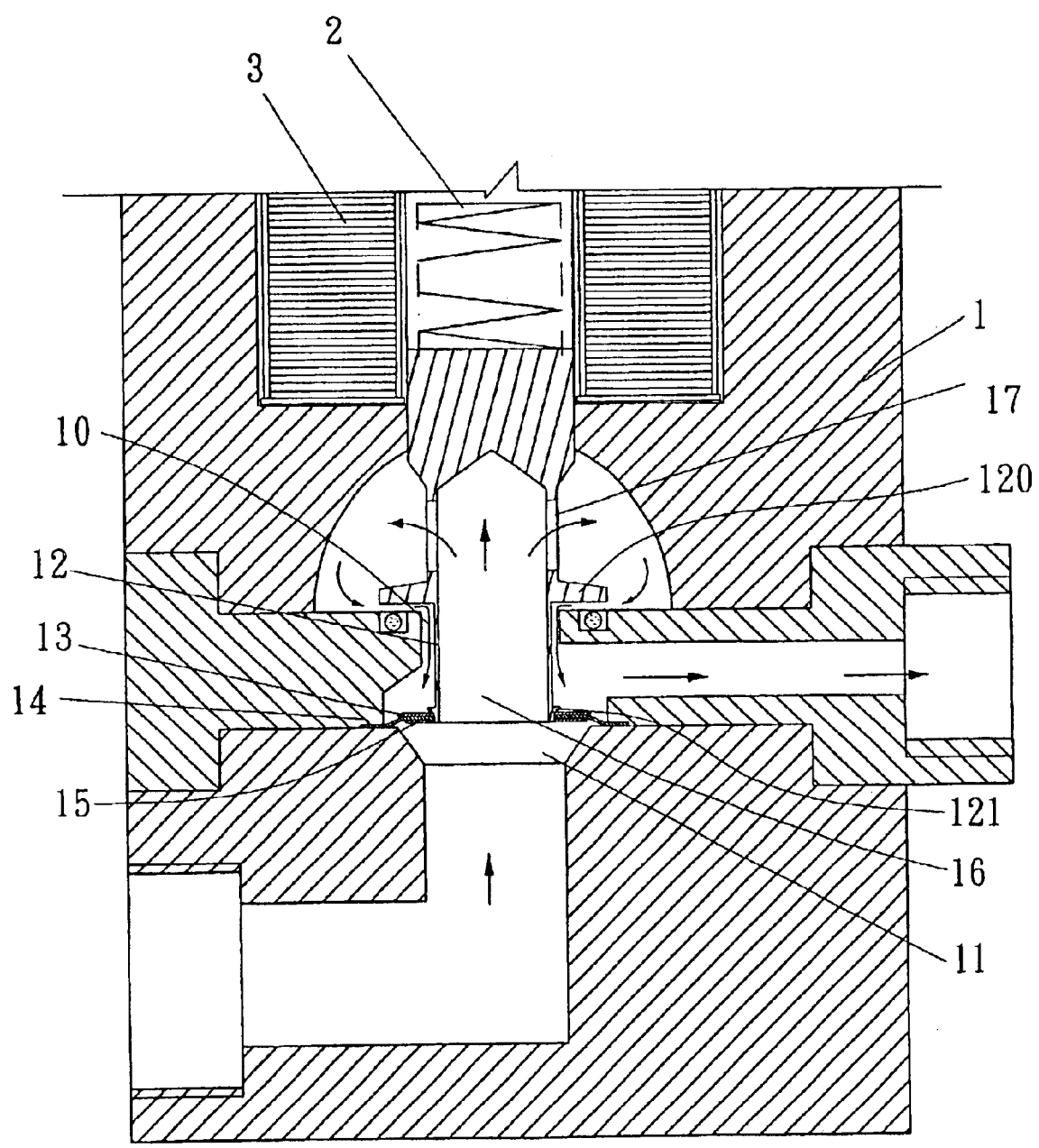
FIG. 5 is a schematic view of the invention in an operating condition.
Figure 6:
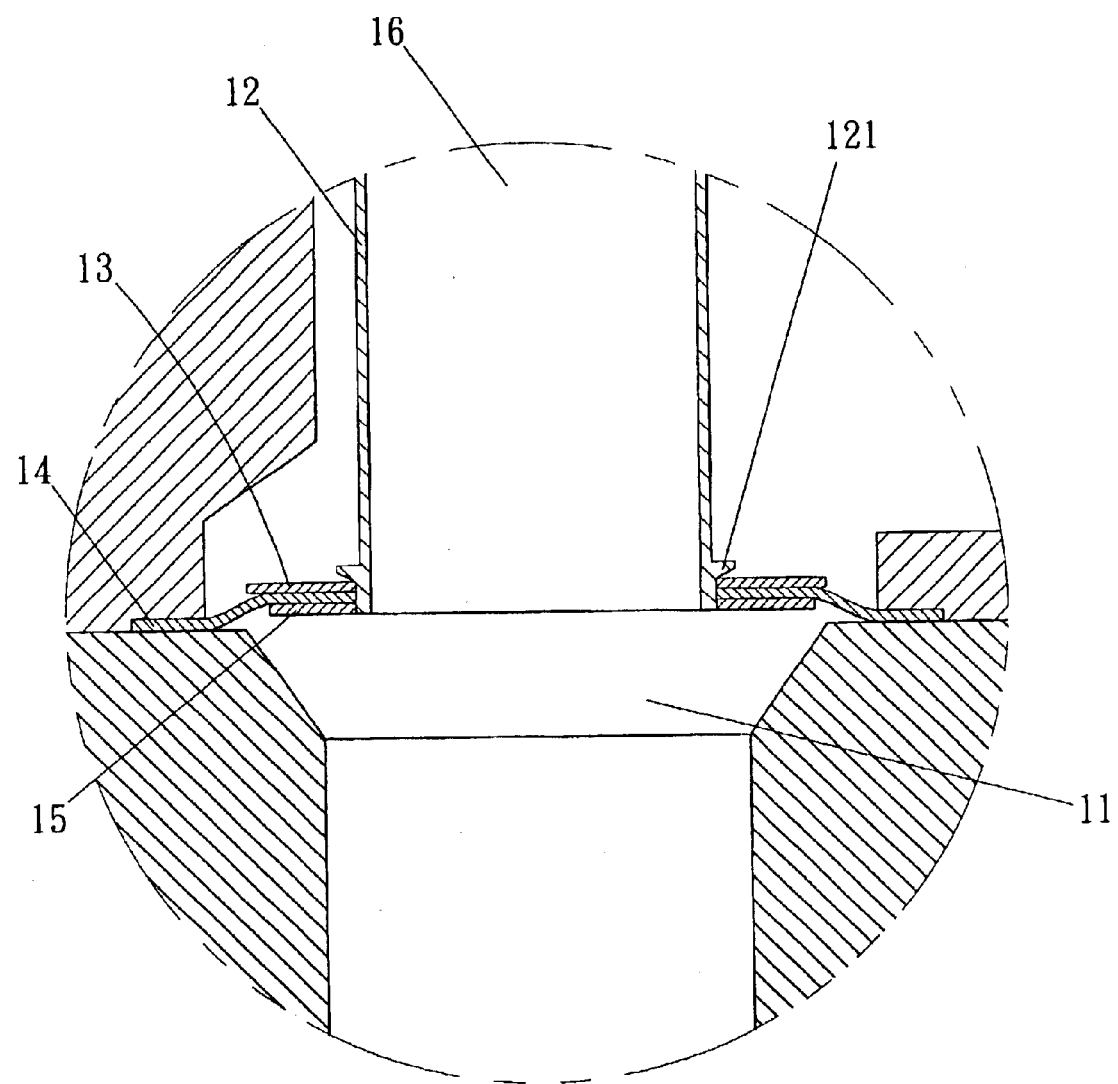
FIG. 6 is a schematic view of the invention in another operating condition.

Referring to FIG. 5, as the valve stem 12 is at the zero pressure and no loading state, when employing the electromagnetic coil 3 to open or close the valve, the valve stem 12 may be moved upwards to enable the second valve opening to form a passage, and the conveying goods may pass through to enter the next flowing process. The first valve opening have a larger sealing scope due to the membrane, thus when the valve stem 12 is moved upwards, the membrane is merely deformed, and the first valve opening remains closed (referring to FIG. 6).

What is claimed is:

1. A zero pressure electromagnetic server, comprising:
 a main body having a first valve opening and a second valve opening located in a valve passage which communicates with an inlet and an outlet; and
 a valve stem having a first sealing side to seal the first valve opening and a second sealing side to seal the second valve opening, and a center opening formed in the interior thereof leading to an axial flow opening normal to the center opening to communicate with a space formed by the two valve openings;

wherein a positive pressure enters into the main body to generate a thrust force on the first sealing side, the positive pressure being channeled through the axial flow opening to synchronously generate a bucking force on the second sealing side opposite to the thrust force, the first sealing side and the second sealing side having a same pressure receiving area such that the thrust force and the bucking force are offset with each other to create a zero pressure and no loading state for the valve stem.

2. The zero pressure electromagnetic server of claim 1, wherein the sealing sides are selectively hard type or soft type structures.

3. The zero pressure electromagnetic server of claim 1, wherein the second sealing side and the valve stem are integrally formed.

4. The zero pressure electromagnetic server of claim 1, wherein the first seal side includes a washer, a fixing plate and a membrane mounting onto the fixing plate.

5. The zero pressure electromagnetic server of claim 1, wherein the valve stem has a tail end coupling with a spring for pushing the sealing sides to form a closed condition, the valve stem being surrounded by an electromagnetic coil which controls upward and downward movements of the valve stem to control opening and closing of the valve opening.

* * * * *